United States Patent [19]

O'Neill

[11] Patent Number: 4,532,799

[45] Date of Patent: Aug. 6, 1985

[54] LIQUID LEVEL SENSOR

[75] Inventor: Michael J. O'Neill, Wilton, Conn.

[73] Assignee: The Perkin-Elmer Corporation, Norwalk, Conn.

[21] Appl. No.: 506,232

[22] Filed: Jun. 17, 1983

[51] Int. Cl.³ .............................................. G01F 23/24
[52] U.S. Cl. ....................................... 73/295; 340/622
[58] Field of Search ............. 73/295, 304 R; 340/622, 340/608; 62/125

[56] References Cited

U.S. PATENT DOCUMENTS

| 2,456,617 | 12/1948 | Burch ................................... 73/295 |
| 2,978,691 | 4/1961 | Beher ................................. 73/295 X |
| 3,324,722 | 6/1967 | Reicks ................................... 73/295 |
| 3,465,315 | 9/1969 | Alexander et al. ................. 340/622 |
| 3,496,773 | 2/1970 | Cornish ................................. 73/295 |
| 4,449,403 | 5/1984 | McQueen .............................. 73/295 |

Primary Examiner—Daniel M. Yasich
Attorney, Agent, or Firm—E. T. Grimes; J. D. Crane

[57] ABSTRACT

A liquid level sensor includes a sensor coil co-axially positioned within a heater coil. Preferably, the sensor is coiled on a core of thin-walled stainless steel tubing to minimize the thermal conductivity along the axis thereof. The probe provides a continuous measurement of the level of a liquid due to the difference in thermal conductivity between the vapor and the liquid within the reservoir.

2 Claims, 4 Drawing Figures

LIQUID LEVEL SENSOR

BACKGROUND OF THE INVENTION

The present invention generally relates to a liquid level sensor and, in particular, relates to such a sensor which is remotely capable of providing a continuous indication of the level of a liquid.

The determination of the level of a liquid is required in a wide variety of circumstances. One field wherein such a determination is frequently required is the field of analytical instruments. For example, in many types of analysis it is necessary to provide the user of an instrument with the capability of performing measurements at rather low temperatures. One manner of providing such low temperatures is by use of coolants such as, for example, liquid nitrogen. In most instances the coolants are kept in a Dewar flask or some other similarly constructed insulated reservoir.

Conventionally, the liquid level is monitored by a plurality of liquid presence sensors strategically positioned within the reservoir. For example, three sensors, one near the highest point, one at the half-full point and one near, or on, the bottom, are usually considered sufficient.

However, with the advent of computerized controlled analysis it has become increasingly important to monitor the amount of coolant available. The importance has increased since, if an analysis is being performed on a plurality of samples or if a plurality of tests are being performed on a single sample, the test results may become compromised if the analysis is interrupted to replenish the coolant. Under such circumstances it is almost a necessity to continuously monitor the coolant level to ensure that sufficient coolant is available for a given series of tests. Naturally, any thermal equilibrium achieved would be destroyed by adding coolant to the reservoir during the analysis.

SUMMARY OF THE INVENTION

Accordingly, it is one object of the present invention to provide a liquid level sensor which continuously and accurately senses the level of a remotely located liquid.

This object is achieved, at least in part, by means of a sensor positioned within a source of thermal energy.

Other objects and advantages will become apparent to those skilled in the art from the following detailed description read in conjunction with the appended claims and the drawing affixed hereto.

BRIEF DESCRIPTION OF THE DRAWING

The drawing, not drawn to scale, includes.

DETAILED DESCRIPTION OF THE INVENTION

Figure 1:
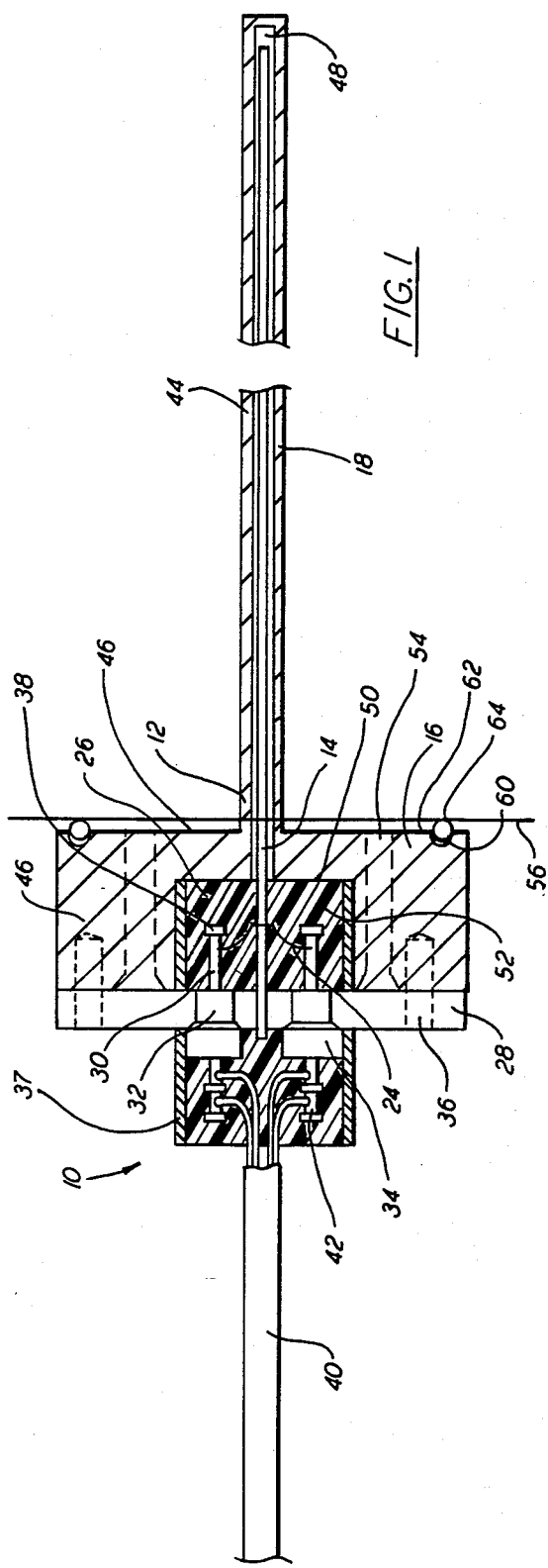
FIG. 1 which is a partial cross-sectional view of a liquid level sensor embodying the principles of the present invention.

A liquid level sensor, generally indicated at 10 in the drawing and embodying the principles of the present invention, includes a probe portion 12 having a core 14, a base assembly 16 and a probe sheath 18. The core 14 of the probe 12 is rigidly affixed in the base assembly 16, which base assembly 16 is removably connected to the probe sheath 18. In use, the probe sheath 18 is sealingly affixed so as to extend into a liquid, the level of which is to be monitored, or sensed. The base assembly 16 is then inserted into the sheath 18 and affixed thereto.

In a preferred embodiment the probe 12 includes a core 14, a heating element 20 and a sensor element 22. The sensor element 22 is electrically insulated from, but in a thermally conductive relationship with, the heating element 20. The sensor element 22 is positioned within the heating element 20 of thermal energy and external the core 14. Preferably, the sensor element 22 is coaxial and co-extensive with the source 20.

Figure 2:
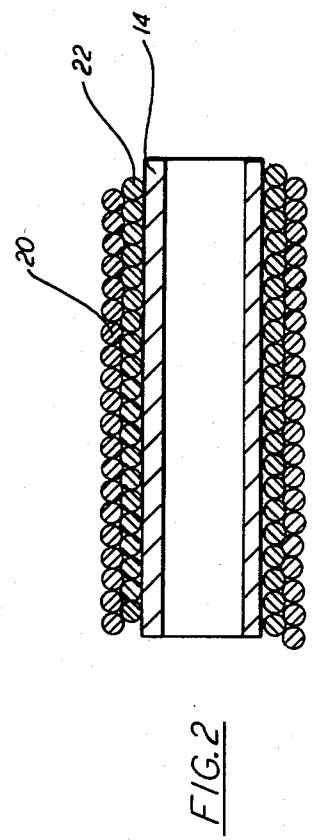
FIG. 2 which is a cross-sectional view of a segment of the sensor shown in FIG. 1.

As shown in FIG. 2, the core 14 is a thin-walled stainless steel tube having a wall thickness of about 0.25 millimeter and an outside diameter of about 0.75 millimeter. In the embodiment shown, the sensor element 22 is a small diameter wire wrapped about, and adjacent, the core 14. The selection of a thin-walled stainless steel tube for the core 14 of the probe 12 serves to minimize thermal conductivity in the axial direction of the probe 12 thereby improving the accuracy of the liquid level determination. Preferably, a first length, i.e., about 38 meters, of #40 AWG enamel coated copper wire is folded in half and uniformly wound on the core 18. In this manner the ends 24 of the sensor element 22 remain proximate the base assembly 16. In one particular assembly technique each coil of the element 22 is lightly coated with epoxy during the winding to retain the uniformity of the wound element 22.

In this same embodiment, the heating element 20 is a small diameter wire wrapped about, and adjacent, the sensor element 22. Preferably, a second length of about 43 meters of #36 AWG enamel coated manganin wire is folded in half and uniformly wound about, and adjacent, the sensor element 22. The heating element 20 can be formed using techniques similar to those used for forming the sensor element 22. Other wire sizes and assembly techniques known in the art may also be employed.

For reasons which will become apparent, the core 14 is rigidly affixed to the base assembly 16. The base assembly 16 preferably includes an encapsulated central portion 26 and a flange member 28 having a plurality of electrically conductive terminals 30 passing therethrough. In one embodiment, the flange member 28 is a stainless steel disc having openings 32 therethrough. The terminals 30 pass through the opening 32 via electrical insulators 34 to electrically isolate the terminals 30 from the flange member 28. The flange member 28 additionally includes a plurality of through-holes 36 via which the base assembly 16 is removably attachable to the probe sheath 18. During the encapsulation process a central sheath 37 is provided to form the encapsulated central portion 26.

As shown in FIG. 1, the ends of the wires of the sensor element 22 and the heating element 20 are electrically connected to the ends 38 of the terminals 30 on the probe side of the flange member 28. Cable 40 is electrically connected to the other ends 42 of the terminals 30.

Figure 3:
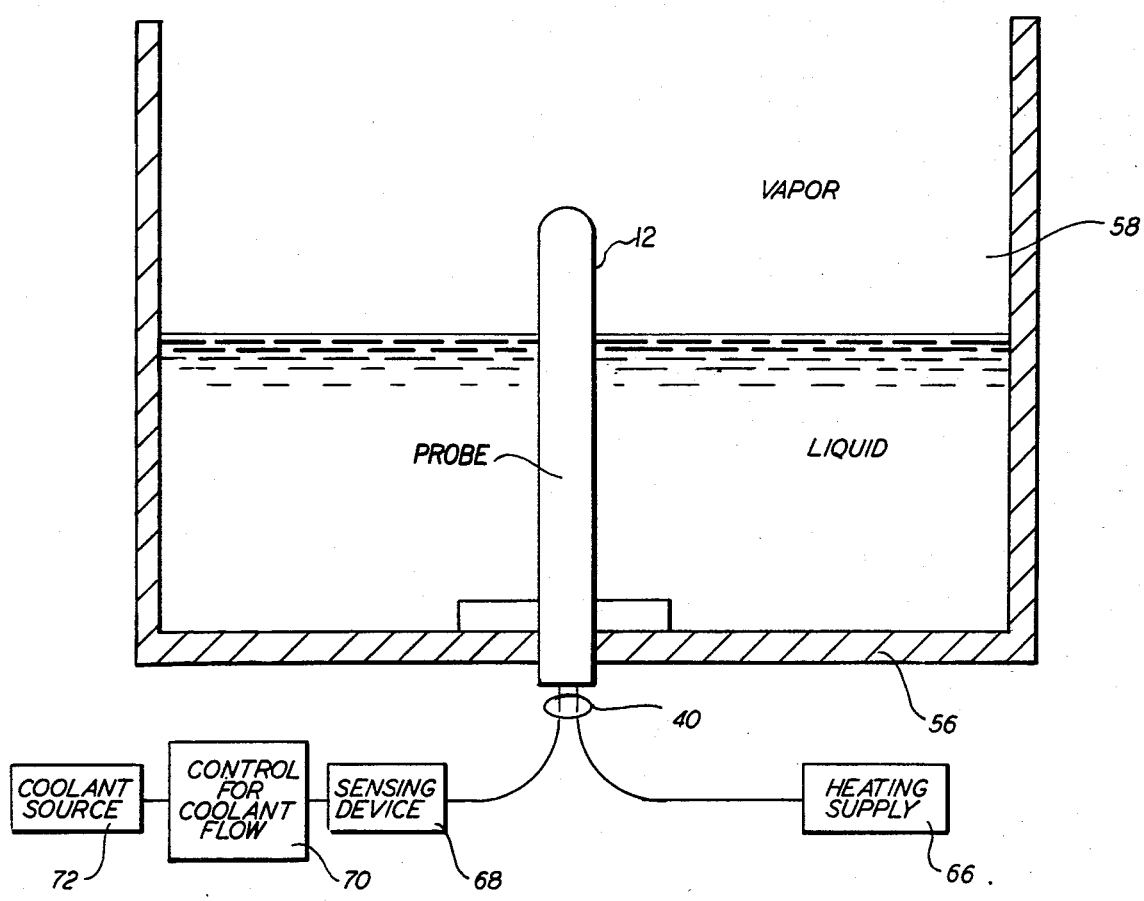
FIG. 3 is a partial cross-sectional view of an arrangement employing the sensor shown in FIG. 1.

The probe sheath 18 includes a probe cover 44 affixed to a mounting flange 46. The probe cover includes a blind opening 48 therein, which opening 48 is adapted to receive the probe 12. The mounting flange 46 includes a cavity 50 for receiving one end 52 of the encapsulated central portion 26 of the base assembly 16 proximate the probe 12. The mounting flange 46 is provided with a plurality of through bores 54 by which the mounting flange 46 is affixed to a wall 56 of a reservoir 58, as shown in FIG. 3. In order to effect a fluid-tight seal between the mounting flange 46 and the wall 56, the mounting flange 46 is preferably provided with a peripheral groove 60 in the face 62 thereof. An O-ring 64 is inserted in the groove 60 such that when the mounting flange 46 is affixed to the wall 56 a fluid-tight seal is created thereby.

Referring to FIG. 3, wherein an operational assembly is illustrated, a heater supply 66 is electrically connected to the ends of the source 20 of thermal energy and a sensing device 68 is electrically connected to the sensor element 22. The heater supply 66 can be a conventional controllable d.c. voltage source. Preferably, to achieve an accurate liquid level measurement the sensing device 68 includes a Wheatstone bridge arrangement to ascertain the ohmic resistance of the sensor element 22. As more fully discussed below, the ohmic resistance of the sensor element 22 is directly related to the level of the liquid.

In operation, the sensor 10 is affixed to the wall 56 of the coolant reservoir 58 such that the probe 12 extends thereinto. The heater supply 66 is set to supply a current through the heating element 20 which raises the temperature of the vapor portion around the sheath 18 about 50° C. The ohmic resistance is accurately determined by the sensing device 68 and the liquid level in the reservoir 58 is directly determinable therefrom. By appropriate conventional control means 70 a coolant source 72 can be regulated such that when the liquid reaches a preselected level in the reservoir 58 more coolant can be added thereto. Naturally, the addition of coolant as well as the control thereof can be performed by well known process control techniques employing a computer. In such an instrument the computer can also coordinate the adding of coolant with the analytical tests being performed to ensure that the coolant is added during a propitious interval.

Figure 4:
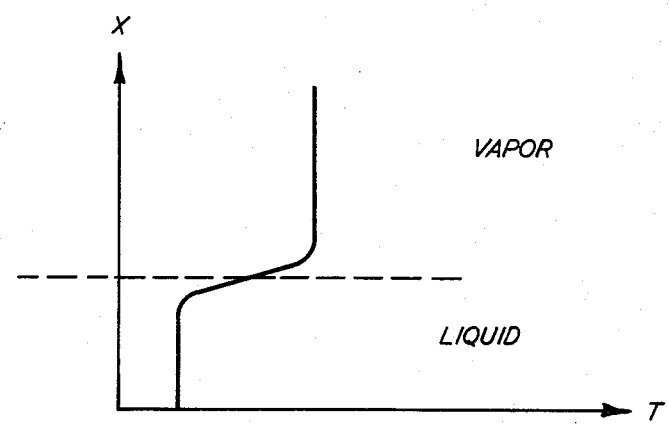
FIG. 4 is a graph of the temperature distribution within a reservoir.

The liquid level sensor 10 operates on the principle that the termal conductivity of a vapor differs from that of a liquid. Consequently, the thermal energy reaching the sensor 10 is different for the portion in the vapor than for the portion in the liquid since more heat is carried away from the heater in the vapor than in the liquid. As shown in FIG. 4, by utilizing relatively small diameter wire for the sensing coil and, by minimizing the thermal conductivity along the axis, the temperature change across the vapor/liquid interface is abrupt. Consequently that transition is related to a particular value of the ohmic resistance of the sensor. That is, the ohmic resistance of the sensor element 22 is directly dependent upon the length thereof extending into the vapor and the length thereof remaining in the liquid. Thus, the level of the liquid is readily determinable by an accurate measurement of the resistance of the sensing element 22.

The present liquid level sensor 10 is advantageous, not only because it remotely determines the exact level in a continuous manner, rather than at discrete levels, but also because of its accurate operation even in a pressurized reservoir.

Although the present probe has been described with respect to a specific embodiment, this embodiment is exemplary only and not considered limiting. The present invention is deemed limited only by the appended claims and the reasonable interpretation thereof.

What is claimed is:

1. An apparatus for use in remotely determining the level of a liquidified gas said apparatus comprising, in combination:

an elongated thin-walled hollow tubular metallic core;

an elongated sensor element in the form of a small diameter wire wound about, adjacent and coaxial with said core;

an elongated heating coil in the form of a wire wound about, adjacent and coaxial with said sensor element, said sensor element and said heating coil being electrically insulated but in thermally conductive relationship with respect to each other;

an elongated probe sheath surrounding said tubular core and said sensor element and said heating coil to isolate said sensor element and said heating coil from said liquid and to prevent said liquid from entering the interior of said core;

said tubular core, sensor element, heating coil and probe sheath being partially immersible in the liquid whose changes in level are to be detected;

means for energizing said heating coil;

means for determining the ohmic resistance of said sensor element;

a base assembly including means for connecting said sensor element and said heating coil thereto; and means for sealingly mounting said base assembly to a wall of a reservoir for containing said liquid.

2. Apparatus according to claim 1 wherein the wall thickness of said tubular core is of the order of about 0.25 millimeters.

* * * * *